US 6,275,888 B1

(12) United States Patent
Porterfield

(10) Patent No.: US 6,275,888 B1
(45) Date of Patent: Aug. 14, 2001

(54) METHOD FOR CONFIGURING PEER-TO-PEER BUS BRIDGES IN A COMPUTER SYSTEM USING SHADOW CONFIGURATION REGISTERS

(75) Inventor: A. Kent Porterfield, New Brighton, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/524,625

(22) Filed: Mar. 13, 2000

Related U.S. Application Data

(63) Continuation of application No. 08/974,374, filed on Nov. 19, 1997, now abandoned.

(51) Int. Cl.[7] .............................. G06F 13/00; G06F 13/38
(52) U.S. Cl. .............................. 710/129; 710/4; 710/100; 710/120; 710/126; 710/129; 710/130; 710/243; 710/128; 712/29
(58) Field of Search ........................... 710/100, 4, 120, 710/126, 129, 130, 243, 128; 709/220; 712/29

(56) References Cited

U.S. PATENT DOCUMENTS

| | | | |
|---|---|---|---|
| 4,589,063 | * | 5/1986 | Shah et al. ........................... 710/8 |
| 5,379,431 | * | 1/1995 | Lemon et al. ........................ 710/10 |
| 5,568,619 | * | 10/1996 | Blackledge et al. ................ 710/101 |
| 5,640,570 | * | 6/1997 | St. Clair et al. ..................... 710/260 |
| 5,734,847 | * | 3/1998 | Garbus et al. ....................... 710/129 |
| 5,754,436 | * | 5/1998 | Walsh et al. ......................... 713/300 |
| 5,761,458 | * | 6/1998 | Young et al. ......................... 710/128 |
| 5,790,831 | * | 8/1998 | Lin et al. .............................. 710/101 |
| 5,819,112 | * | 10/1998 | Kusters ................................. 710/36 |
| 5,832,245 | * | 11/1998 | Gulick ................................. 710/129 |
| 5,838,899 | * | 11/1998 | Leavitt et al. ........................ 714/56 |
| 5,838,935 | * | 11/1998 | Davis et al. ......................... 710/129 |
| 5,848,249 | * | 12/1998 | Garbus et al. ....................... 710/128 |
| 5,854,910 | * | 12/1998 | Gulick ................................. 710/129 |
| 5,867,730 | * | 2/1999 | Leyda .................................. 710/10 |
| 5,878,237 | * | 3/1999 | Olarig ................................. 710/128 |
| 5,983,303 | * | 11/1999 | Sheafor et al. ...................... 710/126 |
| 6,092,141 | * | 7/2000 | Lange ................................. 710/129 |
| 6,119,192 | * | 9/2000 | Kao et al. ............................ 710/128 |

OTHER PUBLICATIONS

PCI Local Bus, "PCI to PCI Bridge Architecture Specification," Revision 1.0, Apr. 15, 1994, pp. 1–66.

* cited by examiner

Primary Examiner—Ayaz Sheikh
Assistant Examiner—Frantz B. Jean
(74) Attorney, Agent, or Firm—Dorsey & Whitney LLP

(57) ABSTRACT

A method of configuring a computer system having a processor coupled by a host bus to first and second bus devices causes the processor to transmit on the host bus one or more configuration write commands that include configuration data representing a range of addresses assigned to the second bus device. The configuration data is stored on the first and second bus devices. The processor transmits on the host bus a transaction request directed to an address within a range of addresses assigned to the second bus device. The first bus device determines that it should not transmit a response to the transaction request based on the configuration data stored in the first bus device. The first bus device may include a set of configuration registers for storing configuration data regarding the first bus device and a set of shadow configuration registers for storing configuration data regarding the second bus device.

40 Claims, 3 Drawing Sheets

METHOD FOR CONFIGURING PEER-TO-PEER BUS BRIDGES IN A COMPUTER SYSTEM USING SHADOW CONFIGURATION REGISTERS

CROSS-REFERENCE TO RELATED APPLICATION

This application is a continuation of U.S. patent application Ser. No. 08/974,374, filed Nov. 19, 1997 now abandoned.

TECHNICAL FIELD

The present invention relates to computer systems, and more particularly, to a method of configuring a computer system with a peer to peer arrangement of computer buses.

BACKGROUND OF THE INVENTION

A computer system typically includes a central processing unit (CPU) coupled by communication pathways known as computer buses to various computer components, such as memory, input devices, and a video monitor. To enable the CPU to communicate with the computer components, the computer components must be configured to communicate in an organized manner. Typically, each computer device includes a set of configuration registers that store configuration data, such as data identifying the type and capabilities of the computer device. Some of the configuration data, such as the device type, is provided with the computer device by the device manufacturer. In addition, the CPU typically provides each computer device with additional configuration data that defines how the computer devices will interact with each other and with the CPU.

Virtually all computer devices utilize some memory address space, input/output (I/O) address space or both. When the computer system is turned on, the computer system must be configured so that each computer device's I/O and memory functions occupy mutually exclusive address ranges. After determining how much memory and I/O space a computer device requires, the CPU assigns the computer device I/O and/or memory address ranges that do not conflict with I/O and memory address ranges assigned to any other computer device of the computer system.

A block diagram of a typical prior art computer system 10, employing a hierarchical architecture of computer buses, is shown in FIG. 1. The computer system 10 includes a computer processor 12 coupled by a host bus 14 to a read-only memory (ROM) device 16, a host-PCI bridge 18 and a memory controller 20 coupled to a system memory module 22. Coupled to the host-PCI bridge 18 by a first Peripheral Component Interconnect (PCI) bus 24 are a PCI-ISA bridge 26, first PCI-PCI bridge 28, and second PCI-PCI bridge 30. The PCI-ISA bridge 26 couples the first PCI bus 24 to an industry standard architecture (ISA) bus 32 which is coupled to an input device 34 and a floppy drive 36. The first PCI-PCI bridge 28 couples the first PCI bus 24 to a second PCI bus 38, which is coupled to a video controller 40 and a hard drive 42. The second PCI-PCI bridge 30 couples the first PCI bus 24 to a third PCI bus 44, which is coupled to a network adapter 46 and a fax-modem 48.

When the computer system 10 is turned on, the processor 12 configures the computer system 10 based on computer instructions of basic input/output system (BIOS) routines 50 stored in the ROM device 16. The BIOS routines 50 are hardware-specific in that the manufacturer of the computer system 10 designs the BIOS routines specifically for the particular implementation of the computer system 10 being sold. As a result, any configuration of computer buses and computer devices can be employed without limiting the ability of the computer system to be configured by the BIOS routines 50. The BIOS is the only agent responsible for configuring the PCI-PCI bridges, because interrupts for each bus must be routed by the BIOS.

One drawback of configuring the computer system 10 using the hardware-specific BIOS routines 50 is that only computer devices designed according to the configuration rules implemented by the BIOS routines 50 can be added to the computer system 10. The PCI specification is being modified to allow the interrupt routing to be performed by the computer's operating system, such as Microsoft Windows™ and Microsoft Windows NT™. As a result, the operating system must be allowed to configure PCI-PCI bridges using the configuration format defined by the "PCI-PCI Bridge Architecture Specification" issued by the PCI Special Interest Group on Apr. 5, 1994, which is incorporated herein by reference. Such changes to the PCI specification may reduce compatibility problems, but do not provide the operating system with a method of configuring computer systems that do not employ the traditional hierarchical architecture of the computer system 10 shown in FIG. 1.

SUMMARY OF THE INVENTION

An embodiment of the present invention is directed to a method of configuring a computer system having a processor coupled by a host bus to first and second bus devices. The processor transmits on the host bus one or more configuration write commands that include configuration data representing a range of addresses assigned to the second bus device. The configuration data is stored on the first and second bus devices. The processor transmits on the host bus a transaction request directed to an address within a range of addresses assigned to the second bus device. The first bus device determines that it should not transmit a response to the transaction request based on the configuration data stored in the first bus device. The first bus device may include a set of configuration registers for storing configuration data regarding the first bus device and a set of shadow configuration registers for storing configuration data regarding the second bus device.

Another aspect of the invention is directed to a method of configuring first and second PCI bridges in a computer system having a processor coupled by a host bus to the PCI bridges. The first PCI bridge couples a first PCI bus to the host bus and the second PCI bridge couples a second PCI bus to the host bus. The processor transmits on the host bus a configuration command that includes a device identifier that identifies the second PCI bridge and a bus identifier that identifies the first PCI bus. Upon receiving the configuration command from the host bus, the second PCI bridge responds to the configuration command such that the second PCI bridge appears to be directly coupled to the first PCI bus when the second PCI bridge is actually indirectly coupled to the first PCI bus via the host bus and the first PCI bridge.

DETAILED DESCRIPTION OF THE INVENTION

Figure 1:
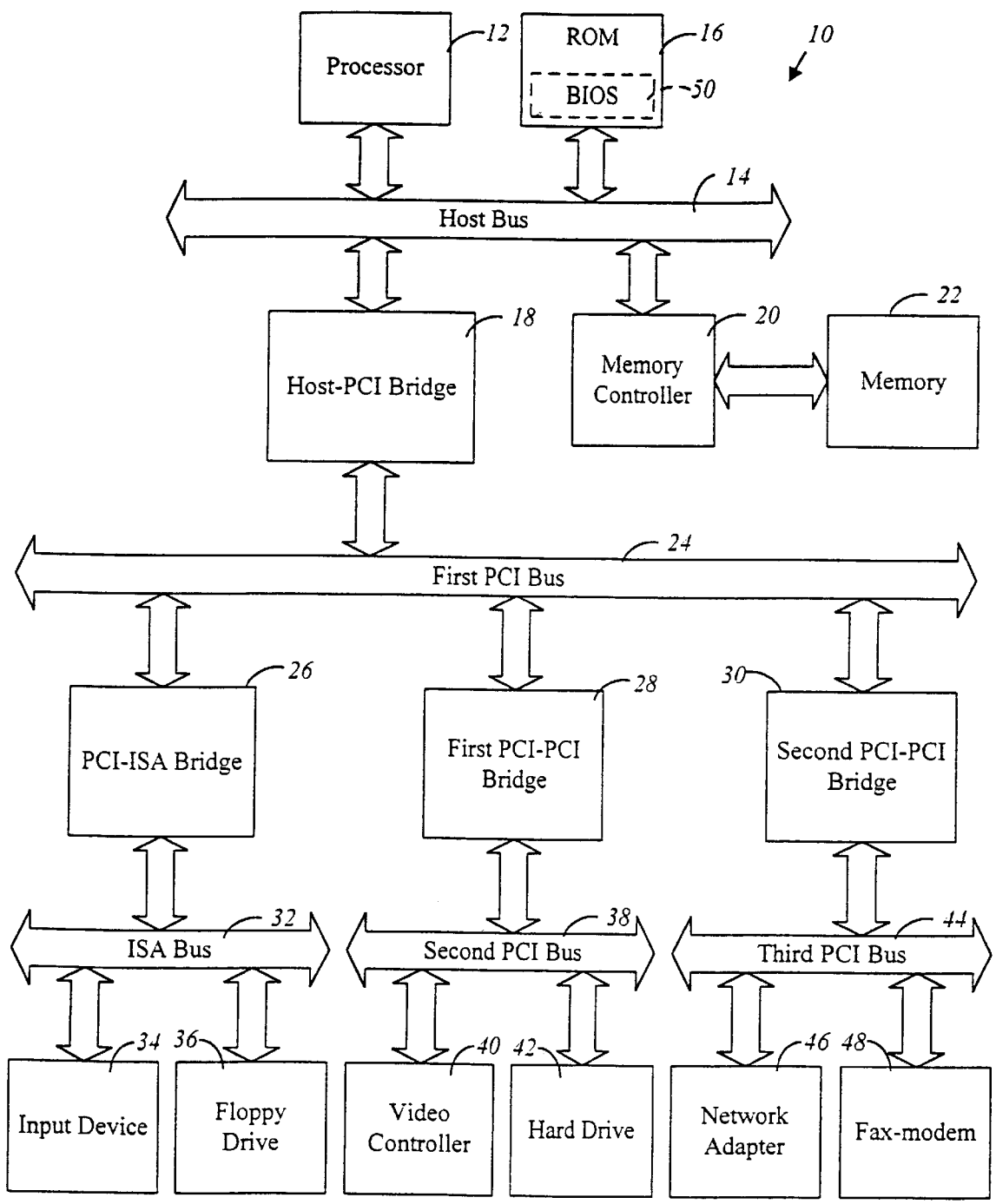
FIG. 1 is a block diagram of a prior art computer system employing a hierarchical arrangement of computer buses.
Figure 2:
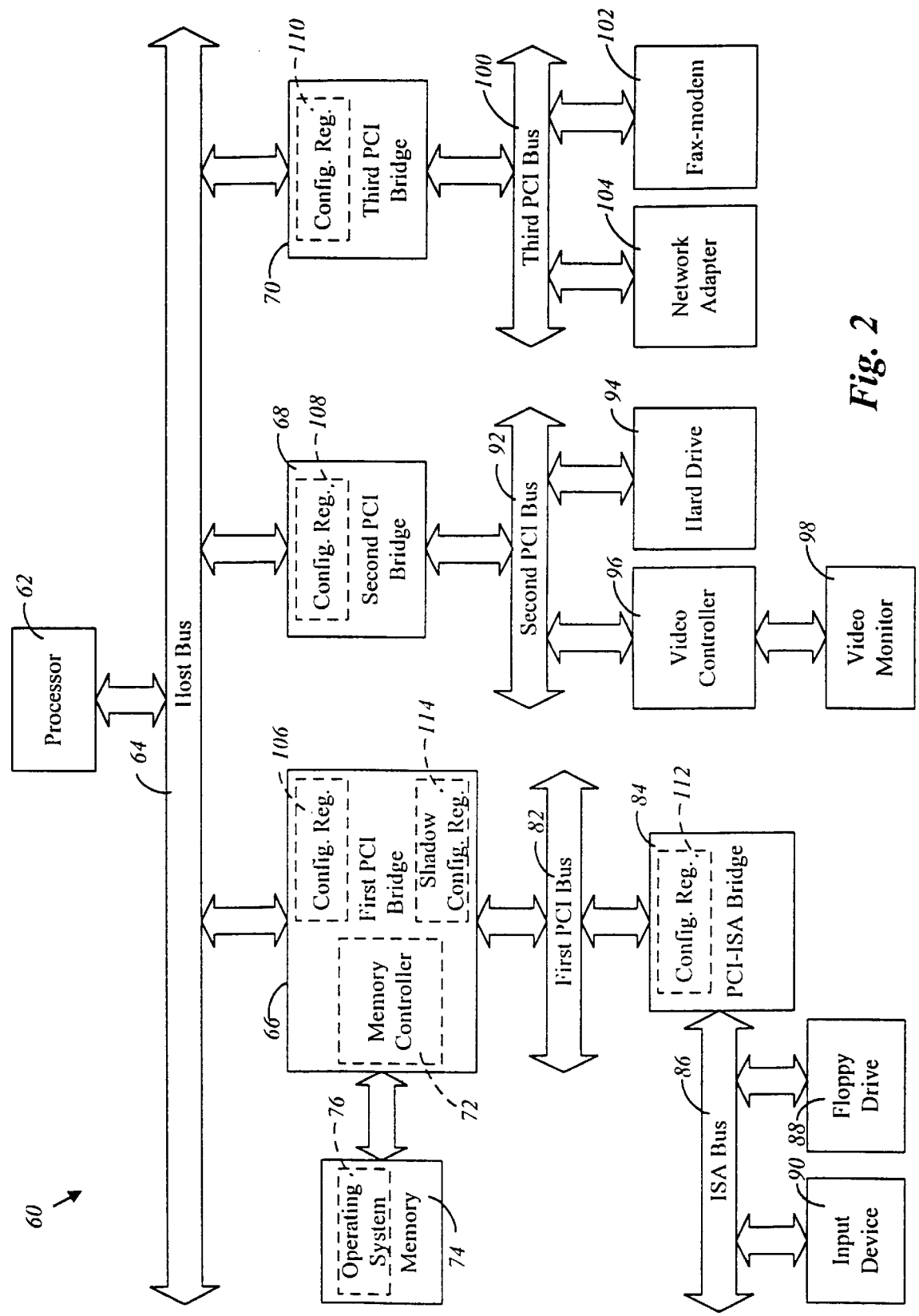
FIG. 2 is a block diagram of a computer system employing a peer to peer arrangement of computer buses according to the present invention.

A block diagram of a computer system 60 that may operate in accordance with an embodiment of the present invention is shown in FIG. 2. In contrast to the hierarchical bus architecture employed in the prior art computer system 10 shown in FIG. 1, the computer system 60 employs a flatter, peer to peer arrangement of computer buses. That is, rather than employing a single host-PCI bridge 18 like the prior art computer system 10, the computer system 60 includes a processor 62 coupled by a host bus 64 to first, second and third peer to peer PCI bridges 66, 68, 70. The first PCI bridge 66 includes a memory controller 72 coupled to a system memory 74 which may be implemented using any type of dynamic random access memory (DRAM). The system memory 74 stores an operating system 76 that controls how the processor 62 interacts with the hardware and software of the computer system 60.

The first PCI bridge 66 couples the host bus 64 to a first PCI bus 82 which is coupled to a PCI-ISA bridge 84. The PCI-ISA bridge 84 couples the first PCI bus 82 to an ISA bus 86, which is coupled to a floppy drive 88 and an input device 90, such as a keyboard, mouse, or microphone that enables a user to input information into the computer system 60. The second PCI bridge 68 couples the host bus 64 to a second PCI bus 92, which is coupled to a hard drive 94 and a video controller 96. The video controller 96 is coupled to a video monitor 98 that enables information to be output to the user. The third PCI bridge 70 couples the host bus 64 to a third PCI bus 100, which is coupled to a fax-modem 102 and a network adapter 104 that enables the computer system to be part of a network, such as a local area network (LAN) or an Intranet.

The PCI bridges 66–70 and the PCI-ISA bridge 84 include configuration registers 106, 108, 110, 112, respectively. Each of the configuration registers 106–112 stores configuration data for its respective bridge 66–70, 84. Among the configuration data stored in the configuration registers 106–112 are memory and I/O address ranges assigned to the respective bridges 66–70, 84 by the processor 62, as discussed in more detail below. The address range assigned to the first PCI bridge 66 includes a memory address range assigned to the system memory 74. Each of the computer devices 88–90, 94–96, 102–104 also includes configuration registers, but further discussion of those configuration registers is well known in the art and is being omitted to avoid unnecessarily obscuring the present invention.

The peer to peer architecture of the PCI bridges 66–70 of computer system 60 shown in FIG. 2 has been found to perform more efficiently than the hierarchical architecture of the computer system 10 shown in FIG. 1. That is because all of the computer components 24–48 downstream of the host-PCI bridge 18 in the system of FIG. 1 must communicate with the processor 12 via the single host-PCI bridge 18 in the computer system 10 while the computer system 60 of FIG. 2 includes three peer to peer PCI bridges 66–70 that enable the computer components 82–104 to communicate with the processor 62. In the prior art computer system 10, the PCI-ISA bridge 26, first PCI-PCI bridge 28, and second PCI-PCI bridge 30 all have to compete for access to the first PCI bus 24 and the host-PCI bridge 18 before transactions from the bridges 26–30 can even compete for the host bus 14. In contrast, in the disclosed embodiment of the inventive method, all three peer to peer PCI bridges 66–70 compete directly for the host bus 64 without having to go through a separate host-PCI bridge.

One problem with the peer to peer arrangement employed by the computer system 60 is that a way must be found to forward transaction requests from the host bus 64 to the PCI-ISA bridge 84 via the first PCI bridge 66 and first PCI bus 82. In the prior art computer system 10 of FIG. 1, the host-PCI bridge 18 simply forwards all transaction requests not claimed by the memory controller 20 to the first PCI bus 24 and the transactions are claimed by either the PCI-ISA bridge 26 or one of the PCI-PCI bridges 28, 30. However, in the computer system 60, the PCI-ISA bridge 84 is not directly connected to the host bus 64 like the PCI bridges 66–70. As a result, the first PCI bridge 66 needs to be provided with a way to claim transaction requests on the host bus 64 that are intended for the PCI-ISA bridge 84.

In order to enable transaction requests to be forwarded to the PCI-ISA bridge 84, the first PCI bridge 66 includes a set of shadow configuration registers 114. The shadow configuration registers 114 are designed to store at least a portion of the configuration data stored in the configuration registers 108, 110 of the second and third PCI bridges 68, 70, respectively. In particular, the shadow configuration registers 114 store the configuration data that reflects the memory and I/O address ranges assigned to the second and third PCI bridges 68, 70. Knowledge of the address ranges assigned to the second and third PCI bridges 68, 70 enables the first PCI bridge 66 to claim all transaction requests on the host bus 64 that do not include addresses within the ranges assigned to the second and third PCI bridges 68, 70. The first PCI bridge 66 forwards such transaction requests on the first PCI bus 82 to the PCI-ISA bridge 84 for further processing.

Assigning non-conflicting memory and I/O address ranges to the PCI bridges 66–70 would be relatively simple if hardware-specific BIOS routines were employed to configure the computer system 60. Such BIOS routines can be programmed with information indicating that the computer system 60 is employing a peer to peer arrangement rather than the hierarchical architecture employed by the prior art computer system 10. However, when the operating system 76 is responsible for configuring the computer system 60, the operating system 76 expects to be configuring a hierarchical architecture with a single host-PCI bridge like the prior art computer system 10.

In the prior art method of operating the computer system 10 of FIG. 1, the processor 12 configures the computer system 10 in several steps based on computer instructions from the BIOS 50. The processor 12 issues configuration read requests to determine what computer devices are being employed in the computer system 10.

Each of the buses 14, 24, 32, 38, 44 is able to be directly coupled to a predetermined number of computer devices in predetermined numbered positions. For example, a PCI bus, such as the PCI buses 24, 38, 44 has 32 numbered positions for directly connecting 32 possible computer devices. The configuration read requests sequentially ask the computer device (if there is one) in each numbered position of each bus to identify relevant information about the computer device, including how much memory and I/O address space is desired by the computer device. These configuration read requests are directed to the configuration registers in each of the computer devices 26–30, 34–36, 40–42, 46–48. Along the way, the processor 12 assigns a bus number to each of the PCI buses 24, 38, 44, beginning with assigning PCI bus number zero to the first PCI bus 24.

After determining how much memory and I/O address space each of the computer devices requests, the processor 12 issues write configuration requests to assign appropriate memory and I/O address ranges to each of the computer devices. The processor 12 issues a write configuration request by using two I/O registers of the host-PCI bridge 18 as an address/data pair. In particular, the processor 12 writes to a configuration address register an address that includes a bus number, device number, function number (or a multi-function device), and a register number for the device function. The bus number indicates the bus to which the intended computer device is directly connected and which is between the device and the host bus 14. The processor also writes the desired configuration data into an I/O register known as a data register. For example, to give the first PCI-PCI bridge 28 a minimum memory address of a memory address range, the processor 12 writes to the configuration address register the bus number of the first PCI bus 24 and the device number for the first PCI-PCI bridge and writes to the data register the minimum address value. The host-PCI bridge 18 recognizes that the bus number written to the configuration address register indicates the first PCI bus 24 which is directly coupled to the host-PCI bridge 18, so the host-PCI bridge 18 forwards the write configuration request on the first PCI bus 24. The first PCI-PCI bridge 28 recognizes that the write configuration request is directed to itself, and copies the minimum memory address into one of its configuration registers.

Given that all memory requests on the host bus 14 are directed to either the memory controller 20 or the host-PCI bridge 18, the host-PCI bridge 18 need not be given a specific memory address range. Instead, the host-PCI bridge 18 is given information indicating the limit of the system addresses granted to the system memory 22, such that the host-PCI bridge 18 knows to respond to all memory requests that have memory addresses outside of the range given to the system memory 22. The host-PCI bridge 18 forwards such memory requests on the first PCI bus 24.

The method of configuring the prior art computer system 10 would be substantially identical if the configuration responsibility switched from the BIOS 50 to the operating system of the computer system 10. The only difference would be that the processor 12 would issue the configuration read and write requests based on instructions from the operating system rather than from the BIOS 50. The processor 12 would still issue configuration requests to the host-PCI bridge 18 which would forward the configuration requests on the first PCI bus 24 in order to program the configuration registers of the PCI-ISA bridge 26, first PCI-PCI bridge 28, and second PCI-PCI bridge 30 and the computer devices 34–36, 40–42, 46–48 subordinate to those bridges 26–30.

However, in the computer system 60, there is no single host-PCI bridge through which the configuration requests can be routed. The PCI bridge specification to be implemented by the operating system 76 does not account for the more efficient peer to peer bus arrangements. Consequently, in order to physically implement the peer to peer PCI bridges 66–70 in a computer system that is configured by the operating system 76, the PCI bridges 66–70 must appear logically as a traditional hierarchical arrangement of buses to the operating system 76.

Based on the configuration instructions from the operating system 74, the processor 62 assigns memory and I/O address ranges to the computer devices 70, 84, 88–90, 94–96, 102–104 as if the computer system 60 were employing a traditional hierarchical arrangement. The operating system 76 views the computer system 60 logically as the first PCI bridge 66 being a host-PCI bridge coupling the host bus 64 to the first PCI bus 82 (which it labels PCI bus zero) that is coupled directly to each of the second and third PCI bridges 68–70. As such, the operating system 76 does not assign a specific memory address range to the first PCI bridge 66. Instead, the first PCI bridge 66 is given information indicating the limit of the system memory addresses assigned to the system memory 74, such that the first PCI bridge 66 knows which memory requests are not directed to the system memory 74.

Of course, in reality, the first PCI bridge 66 does not couple the second and third PCI bridges 68–70 to the host bus 64 because the hierarchical arrangement is not being employed. However, in order to logically appear to the operating system 76 as part of a hierarchical arrangement, the PCI bridges 66–70 respond to the configuration read requests as if the second and third PCI bridges 68–70 were coupled to the host bus 64 by the first PCI bus 82 and the first PCI bridge 66. Thus, the first PCI bridge 66 passes all configuration read requests through to the first PCI bus 82. The second PCI bridge 68 may respond to configuration read requests directed to position number zero of the first PCI bus 82, the third PCI bridge 70 may respond to configuration read requests directed to position number 1 of the first PCI bus 82, and the PCI-ISA bridge 84 may respond to configuration read requests directed to position number 2 of the first PCI bus 82. It will be appreciated that the position number assigned to each of the second and third PCI bridges 68–70 will depend on the position of those PCI bridges 68–70 on the host bus 64. In its responses to the configuration read requests, the PCI bridges 68–70 inform the processor 62 that the device types are PCI bridges. The operating system 76 will query each of the devices 84, 94–96, 102–104 on each PCI bus below each of the PCI bridges 66–70 to determine how much memory and I/O space is required by each device. Using this information, the operating system 76 will determine the amount of memory and I/O space required for each PCI bridge 66–70 by summing up the total requirements for all the devices below that bridge.

Upon learning that the PCI bridges 66–70 are PCI bridges, the processor 62 knows that the PCI bridges 66–70 are coupled to the PCI buses 82, 92, 100 because all PCI bridges are coupled to PCI buses. The processor 62 responds by assigning bus numbers 0, 1, and 2, to the PCI buses 82, 92, 100, respectively. The processor 62 then issues configuration read requests to determine what computer devices are coupled to the PCI buses 82, 92, 100. The configuration read requests will include the bus numbers, so the PCI bridges 66–70 will know that the configuration read requests are intended for the PCI buses 82, 92, 100. As a result, the PCI bridges forward the configuration read requests to their respective PCI buses 82, 92, 100. The computer devices 84, 94–96, 102–104 respond to the configuration read requests with information regarding their device types and address space requirements.

After determining which numbered positions of each of the buses 64, 82, 86, 92, 100 are occupied by computer devices, the processor 62 issues configuration write requests to the computer devices. The configuration write requests include memory and I/O address ranges assigned to each of the computer devices that requested such address ranges in response to the configuration read requests. The processor 62 creates an address translation table that lists the memory and I/O address ranges assigned to each of the computer devices coupled to each of the computer buses 64, 82, 86, 92, 100.

The first PCI bridge 66 monitors all of the configuration write requests transmitted on the host bus 64 to determine which address ranges are being assigned to the second and third PCI bridges 68–70. In addition, the first PCI bridge 66 stores in the shadow configuration registers 114 the address ranges assigned to the second and third PCI bridges 68–70.

Figure 3:
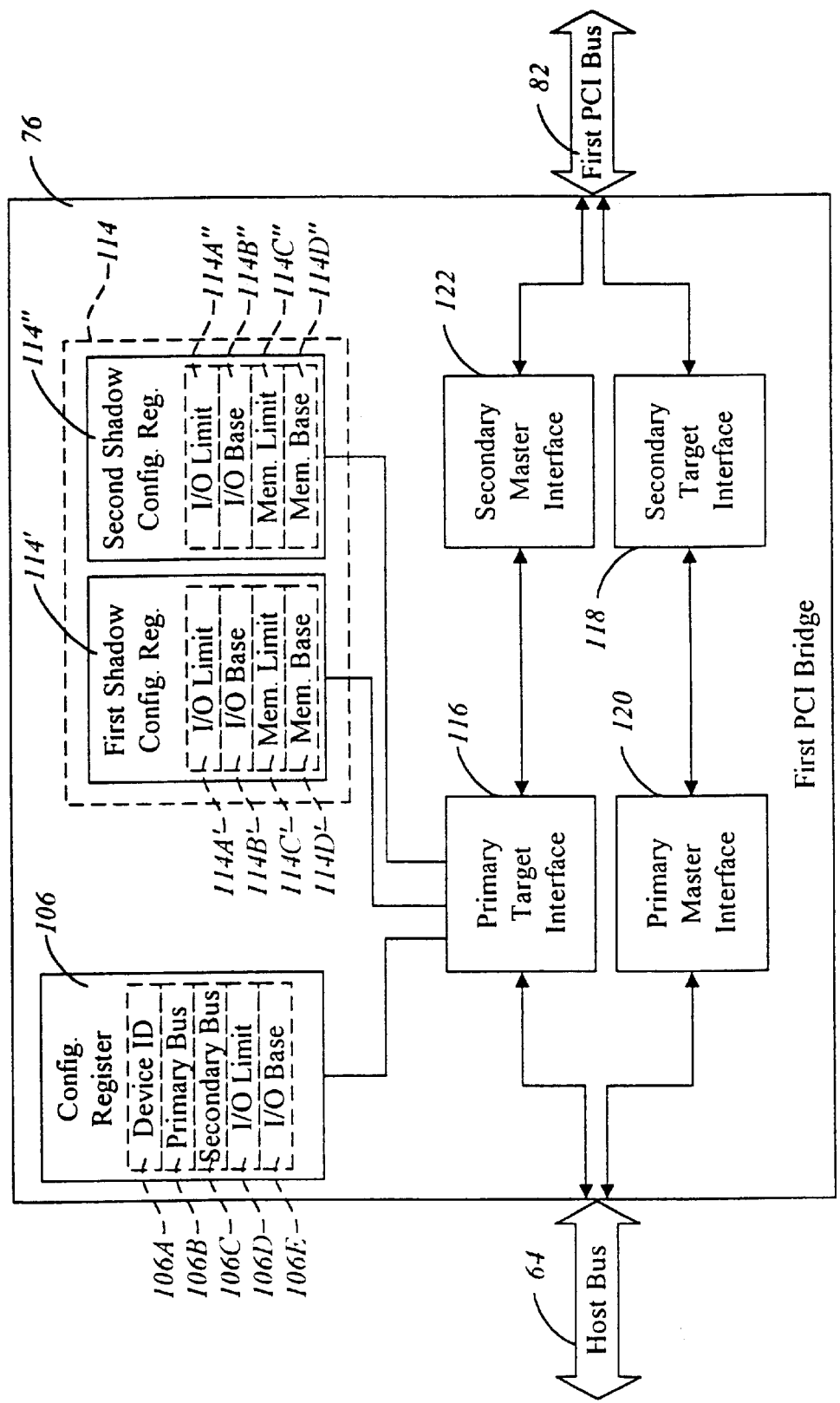
FIG. 3 is a block diagram of a first PCI-PCI bridge employed in the computer system shown in FIG. 2.

A block diagram of the first PCI bridge 66 is shown in FIG. 3. The configuration registers 106 for storing configuration data for the first PCI bridge 66 include a device identifier register 106A, a primary bus register 106B, a secondary bus register 106C, an I/O limit register 106D, and an I/O base register 106E. The device identifier register 106A stores a predetermined device identifier that identifies the first PCI bridge's device type, that is, identifies that it is a PCI bridge. The system manufacturer loads the appropriate device identifier in the device identifier register 106A which is read by the processor 62 using a configuration read request as discussed above. The primary bus number register 106B stores the bus number that is immediately upstream (closer to the processor 62) of the first PCI bridge 66 and the secondary bus register number 106C stores the bus number of the immediately downstream (away from the processor 62) bus with respect to the first PCI bridge 66. In reality, the host bus 64 is the bus that is immediately upstream of the first PCI bridge 66, but because the operating system 76 "thinks" that a virtual PCI bus 0 exists between the host bus 64 and the first PCI bridge 66, the primary bus register 106B stores PCI bus number 0. The I/O limit register 106D and the I/O base register 106E store the upper and lower values, respectively, of the I/O address range assigned to the first PCI bridge 66.

It should be appreciated that the PCI specification also refers to several other registers (not shown) that should be included in the configuration register file 106, including a command register, secondary and subordinate bus number registers, prefetchable memory base/limit registers, and a bridge control register. The function of each of these registers is discussed in the "PCI To PCI Bridge Architecture Specification" discussed above. However, a detailed discussion of these registers is not necessary for an understanding of the invention, and thus, is being omitted for simplicity.

The shadow registers 114 of the first PCI bridge 66 include a first set of shadow configuration registers 114' and a second set of shadow configuration registers 114" for the address ranges assigned to the second and third PCI bridges 68, 70, respectively. The first set of shadow configuration registers 114' include an I/O limit register 114A', and I/O base register 114B', a memory limit register 114C', and a memory base register 114D' for storing the I/O and memory address ranges assigned to the second PCI bridge 68. The second set of shadow configuration registers 114" includes an I/O limit register 114A", an I/O base register 114B", a memory limit register 114C", and a memory base register 114D" for storing the I/O and memory address ranges assigned to the third PCI bridge 70. The shadow configuration registers 114 may also include other configuration registers (not shown), such as the command, secondary subordinate bus number, prefetchable memory base/limit, and bridge control registers discussed above.

The first PCI bridge 66 also includes primary and secondary target interfaces 116, 118 and primary and secondary master interfaces 120, 122. The primary target interface 116 is coupled between the host bus 64 and the secondary master interface 122 which is coupled to the first PCI bus 82. The primary target interface 116 and the secondary master interface 122 execute transactions directed to the first PCI bus 82 from the host bus 64. The secondary target interface 118 is coupled between the first PCI bus 82 and the primary master interface 120 which is coupled to the host bus 64. The secondary target interface 118 and the primary master interface 120 execute transactions directed to computer devices on the host bus 64 from computer devices coupled to the first PCI bus 82.

The primary target interface 116 is responsible for monitoring the host bus 64 for configuration requests directed to any of the PCI bridges 66–70. As such the primary target interface 116 responds to configuration read requests directed to the first PCI bridge 66 by reading the requested data from the configuration registers 106 and transmitting the configuration data to the processor 62 via the host bus 64. In addition, the primary target interface 116 responds to configuration write requests directed to any of the PCI bridges 66–70 by writing the configuration data in the configuration write requests to the appropriate one of the configuration registers 106, 114 depending on which of the PCI bridges the configuration write requests are directed.

After all of the configuration registers of the computer devices 66–70, 84, 88–90, 94–96, 102–104 in the computer system 60 are configured, the computer devices are ready to process computer transactions. For example, if a transaction request is directed to a memory address within the range of memory addresses assigned to the second PCI bridge 68, then the second PCI bridge determines from its configuration register 108 that it should respond to the transaction request. The second PCI bridge 68 responds by forwarding the transaction request on the second PCI bus 92 so that either the hard drive 94 or video controller 96 can execute the transaction request depending on which of them was assigned the address included in the transaction request. In addition, the first PCI bridge 66 determines from its shadow configuration registers 114' that the first PCI bridge 66 should not respond to the transaction request.

If the processor 62 issues a transaction request directed to the floppy drive 88, then the first PCI bridge 66 must claim the transaction request off of the host bus 64. The first PCI bridge 66 will compare the address included in the transaction request with the memory address range assigned to the system memory 74 and with the address ranges in the shadow configuration registers 114 to determine whether the address in the transaction request is within the address ranges assigned to the second and third PCI bridges 68, 70. Given that the floppy drive 88 is not coupled to the host bus 64 by either of the second and third PCI bridges 68, 70, the first PCI bridge 66 determines that the transaction request is not directed to either of the second and third PCI bridges 68, 70. In response, the first PCI bridge 66 claims the transaction request from the host bus 64 and forwards the transaction request on the first PCI bus 82. The PCI-ISA bridge 84 claims the transaction request from the first PCI bus 82 and forwards the transaction request to the floppy drive 88 via the ISA bus 86.

Based on the foregoing discussion, it will be appreciated that the embodiments of the present invention enables a peer to peer arrangement of computer buses to be configured by an operating system designed to configure only hierarchical arrangements of computer buses. As such, the advantages of the peer to peer arrangement are obtained without requiring hardware-specific BIOS routines to configure the computer system. The embodiments discussed above employ shadow configuration registers to make the physical peer to peer arrangement logically appear to the operating system as a traditional hierarchical arrangement.

It should be understood that even though numerous advantages of the present invention have been set forth in the foregoing description, the above disclosure is illustrative only. Changes may be made in detail and yet remain within the broad principles of the present invention.

What is claimed is:

1. A method of configuring a computer system having a processor coupled by a host bus to first and second bus devices, the method comprising: directly coupling the first and second bus devices to the host bus;

transmitting one or more configuration write commands on the host bus from the processor based on instructions of an operating system, the one or more configuration write commands including configuration data representing a range of addresses assigned to the second bus device;

storing the configuration data on the first and second bus device;

transmitting from the processor on the host bus a transaction request directed to an address within the range of addresses assigned to the second bus device; and determining, based on the configuration data stored in the first bus device, that the first bus device should not transmit a response to the transaction request.

2. The method of claim 1 wherein the first and second bus devices comprise respective first and second PCI bridges that couple the host bus to respective first and second PCI buses.

3. The method of claim 2 wherein the act of transmitting the one or more configuration write commands includes transmitting one or more PCI type 1 configuration write commands on the host bus and the method further comprises:

determining that the one or more PCI type 1 configuration write commands are intended for the second PCI bridge, and in response, storing the configuration data in the first and second PCI bridges without converting the PCI type 1 configuration write commands into PCI type 0 configuration write commands.

4. The method of claim 1, further comprising:

determining, based on the configuration data stored in the second bus device, that the second bus device should transmit a response to the transaction request; and transmitting a response to the transaction request using the second bus device.

5. The method of claim 1 wherein the act of storing the configuration data in the first and second bus devices includes storing a range of memory addresses and a range of I/O addresses.

6. The method of claim 1 wherein the computer system includes a third bus device coupled to the host bus, the method further comprising:

transmitting one or more configuration write commands on the host bus from the processor, the one or more configuration write commands including configuration data representing a range of addresses assigned to the third bus device; and storing on the first and third bus devices the configuration data representing a range of addresses assigned to the third bus device.

7. The method of claim 1 wherein the act of directly coupling the first and second bus devices to the host bus comprises: Coupling the first and second bus devices to the host bus through respective bus bridges.

8. A method of configuring a computer system having a processor coupled by a host bus to first and second bus devices, the method comprising: directly coupling the first and second bus devices to the host bus;

transmitting one or more configuration write commands on the host bus from the processor based on instructions of an operating system, the one or more configuration write commands including configuration data representing a range of addresses assigned to the second bus device;

capturing the configuration data from the host bus in the first and second bus devices;

storing the configuration data in one or more configuration registers of the second bus device;

storing the configuration data in one or more shadow configuration registers of the first bus device;

transmitting from the processor on the host bus a transaction request directed to an address within the range of addresses assigned to the second bus device; and determining, based on the configuration data stored in the first bus device, that the first bus device should not transmit a response to the transaction request.

9. The method of claim 8 wherein the first and second bus devices comprise respective first and second PCI bridges that couple the host bus to respective first and second PCI buses.

10. The method of claim 9 wherein the act of transmitting the one or more configuration write commands includes transmitting one or more PCI type 1 configuration write commands on the host bus, the act of capturing includes determining that the one or more PCI type 1 configuration write commands are intended for the second PCI bridge, and the act of storing the configuration data in the first and second bus devices includes storing the configuration data in the first and second PCI bridges without converting the PCI type 1 configuration write commands into PCI type 0 configuration write commands.

11. The method of claim 8 further comprising:

transmitting from the processor on the host bus a transaction request directed to an address within the range of addresses assigned to the second bus device;

determining, based on the configuration data stored in the second bus device, that the second bus device should transmit a response to the transaction request; and transmitting a response to the transaction request using the second bus device.

12. The method of claim 8 wherein the acts of storing the configuration data in the first and second bus devices includes storing a range of memory addresses and a range of I/O addresses.

13. The method of claim 8 wherein the computer system includes a third bus device coupled to the host bus, the method further comprising:

transmitting one or more configuration write commands on the host bus from the processor, the one or more configuration write commands including configuration data representing a range of addresses assigned to the third bus device; and storing on the first and third bus devices the configuration data representing a range of addresses assigned to the third bus device.

14. The method of claim 8 wherein the act of directly coupling the first and second bus devices to the host bus comprises: Coupling the first and second bus devices to the host bus through respective bus bridges.

15. A method of configuring first and second PCI bridges in a computer system having a processor coupled by a host bus to the PCI bridges at substantially the same level of hierarchy, the first PCI bridge coupling a first PCI bus to the host bus and the second PCI bridge coupling a second PCI bus to the host bus, the method comprising:

transmitting from the processor on the host bus, based on instructions of an operating system, a configuration command that includes a device identifier that identifies the second PCI bridge and a bus identifier that identifies the first PCI bus;

receiving the configuration command from the host bus at the second PCI bridge; and responding to the configuration command using the second PCI bridge such that the second PCI bridge appears to the processor to be directly coupled to the first PCI bus at a hierarchy below the first PCI bus when the second PCI bridge is actually indirectly coupled to the first PCI bus via the host bus and the first PCI bridge.

16. The method of claim 15 wherein the configuration command comprises a configuration write command that includes configuration data, the method further including:

storing the configuration data in a configuration register file of the second PCI bridge; and storing the configuration data in a shadow configuration register file of the first PCI bridge.

17. The method of claim 16 wherein the configuration data includes a base address that, together with a limit address stored in the first and second PCI bridges, defines an address range assigned to the second PCI bridge, the method further comprising:

transmitting from the processor on the host bus a transaction request directed to an address within the address range assigned to the second PCI bridge; and determining, based on the configuration data stored in the first PCI bridge, that the first PCI bridge should not forward the transaction request to the first PCI bus coupled to the first PCI bridge.

18. The method of claim 16 wherein the configuration data includes a base address that, together with a limit address stored in the first and second PCI bridges, defines an address range assigned to the second PCI bridge, the method further comprising:

transmitting from the processor on the host bus a transaction request directed to an address not within the address range assigned to the second PCI bridge; and determining, based on the configuration data stored in the first PCI bridge, that the first PCI bridge should forward the transaction request to the first PCI bus coupled to the first PCI bridge.

19. The method of claim 16 further comprising:

determining, based on the configuration data stored in the second PCI bridge, that the second PCI bridge should transmit a response to the transaction request; and transmitting a response to the transaction request using the second PCI bridge.

20. A method of configuring a computer system having a processor coupled by a host bus to first and second bus devices, the method comprising:

directly coupling the first and second bus devices to the host bus;

transmitting one or more configuration write commands on the host bus from the processor, the one or more configuration write commands including configuration data representing a range of addresses assigned to the second bus device;

storing the configuration data on the first and second bus devices;

transmitting from the processor on the host bus a transaction request directed to an address within the range of addresses assigned to the second bus device; and determining, based on the configuration data stored in the first bus device, that the first bus device should not transmit a response to the transaction request.

21. The method of claim 20 wherein the first and second bus devices comprise first and second PCI bridges that couple the host bus to respective first and second PCI buses and wherein transmitting the one or more configuration write commands includes transmitting one or more PCI type 1 configuration write commands on the host bus, the method further comprising:

determining that the one or more PCI type 1 configuration write commands are intended for the second PCI bridge, and in response, storing the configuration data in the first and second PCI bridges without converting the PCI type 1 configuration write commands into PCI type 0 configuration write commands.

22. The method of claim 20 further comprising:

determining, based on the configuration data stored in the second bus device, that the second bus device should transmit a response to the transaction request; and transmitting a response to the transaction request using the second bus device.

23. The method of claim 20 wherein the computer system includes a third bus device coupled to the host bus, the method further comprising:

transmitting one or more configuration write commands on the host bus from the processor, the one or more configuration write commands including configuration data representing a range of addresses assigned to the third bus device; and storing on the first and third bus devices the configuration data representing a range of addresses assigned to the third bus device.

24. A method of configuring a computer system having a processor coupled by a host bus to first and second bus devices, the method comprising: directly coupling the first and second bus devices to the host bus;

coupling the first and second bus devices to the host bus without any intervening bus devices;

transmitting one or more configuration write commands on the host bus from the processor, the one or more configuration write commands including configuration data representing a range of addresses assigned to the second bus device;

storing the configuration data on the first and second bus devices;

transmitting from the processor on the host bus a transaction request directed to an address within the range of addresses assigned to the second bus device; and determining, based on the configuration data stored in the first bus device, that the first bus device should not transmit a response to the transaction request.

25. The method of claim 24 wherein the first and second bus devices comprise first and second PCI bridges that couple the host bus to respective first and second PCI buses and wherein transmitting the one or more configuration write commands includes transmitting one or more PCI type 1 configuration write commands on the host bus, the method further comprising:

determining that the one or more PCI type 1 configuration write commands are intended for the second PCI bridge, and in response, storing the configuration data in the first and second PCI bridges without converting the PCI type 1 configuration write commands into PCI type 0 configuration write commands.

26. The method of claim 24 further comprising:
  determining, based on the configuration data stored in the second bus device, that the second bus device should transmit a response to the transaction request; and
  transmitting a response to the transaction request using the second bus device.

27. The method of claim 24 wherein the computer system includes a third bus device coupled to the host bus, the method further comprising:
  transmitting one or more configuration write commands on the host bus from the processor, the one or more configuration write commands including configuration data representing a range of addresses assigned to the third bus device; and
  storing on the first and third bus devices the configuration data representing a range of addresses assigned to the third bus device.

28. The method of claim 24 wherein the act of directly coupling the first and second bus devices to the host bus comprises: Coupling the first and second bus devices to the host bus through respective bus bridges.

29. A method of configuring a computer system having a processor coupled by a host bus to first and second bus devices, the method comprising:
  directly transmitting one or more configuration write commands on the host bus from the processor to the first and second bus devices, the one or more configuration write commands including configuration data representing a range of addresses assigned to the second bus device;
  capturing the configuration data from the host bus in the first and second bus devices;
  storing the configuration data in one or more configuration registers of the second bus device;
  storing the configuration data in one or more shadow configuration registers of the first bus device;
  transmitting from the processor on the host bus a transaction request directed to an address within the range of addresses assigned to the second bus device; and
  determining, based on the configuration data stored in the first bus device, that the first bus device should not transmit a response to the transaction request.

30. The method of claim 28 further comprising:
  transmitting from the processor on the host bus a transaction request directed to an address within the range of addresses assigned to the second bus device; and
  determining, based on the configuration data stored in the first bus device, that the first bus device should not transmit a response to the transaction request.

31. The method of claim 28, further comprising:
  transmitting from the processor on the host bus a transaction request directed to an address within the range of addresses assigned to the second bus device;
  determining, based on the configuration data stored in the second bus device, that the second bus device should transmit a response to the transaction request; and
  transmitting a response to the transaction request using the second bus device.

32. The method of claim 28 wherein the computer system includes a third bus device coupled to the host bus, the method further comprising:
  transmitting one or more configuration write commands on the host bus from the processor, the one or more configuration write commands including configuration data representing a range of addresses assigned to the third bus device; and
  storing on the first and third bus devices the configuration data representing a range of addresses assigned to the third bus device.

33. A method of configuring a computer system having a processor coupled by a host bus to first and second bus devices, the method comprising: directly coupling the first and second bus devices to the host bus;
  transmitting one or more configuration write commands on the host bus from the processor to the first and second bus devices without transmitting to any intervening bus devices, the one or more configuration write commands including configuration data representing a range of addresses assigned to the second bus device;
  capturing the configuration data from the host bus in the first and second bus devices;
  storing the configuration data in one or more configuration registers of the second bus device;
  storing the configuration data in one or more shadow configuration registers of the first bus device;
  transmitting from the processor on the host bus a transaction request directed to an address within the range of addresses assigned to the second bus device; and
  determining, based on the configuration data stored in the first bus device, that the first bus device should not transmit a response to the transaction request.

34. The method of claim 33 further comprising:
  transmitting from the processor on the host bus a transaction request directed to an address within the range of addresses assigned to the second bus device;
  determining, based on the configuration data stored in the first bus device, that the first bus device should not transmit a response to the transaction request.

35. The method of claim 33, further comprising:
  transmitting from the processor on the host bus a transaction request directed to an address within the range of addresses assigned to the second bus device; and
  determining, based on the configuration data stored in the second bus device, that the second bus device should transmit a response to the transaction request; and
  transmitting a response to the transaction request using the second bus device.

36. The method of claim 33 wherein the computer system includes a third bus device coupled to the host bus, the method further comprising:
  transmitting one or more configuration write commands on the host bus from the processor, the one or more configuration write commands including configuration data representing a range of addresses assigned to the third bus device; and
  storing on the first and third bus devices the configuration data representing a range of addresses assigned to the third bus device.

37. The method of claim 33 wherein the act directly coupling the first and second bus devices to the host bus comprises: Coupling the first and second bus devices to the host bus through respective bus bridges.

38. A method of configuring first and second PCI bridges in a computer system having a processor coupled by a host bus to the PCI bridges at substantially the same level of hierarchy, the first PCI bridge coupling a first PCI bus to the host bus and the second PCI bridge coupling a second PCI bus to the host bus, the method comprising:
  directly coupling the first and second bus devices to the host bus;

transmitting from the processor on the host bus a configuration command that includes a device identifier that identifies the second PCI bridge and a bus identifier that identifies the first PCI bus;

receiving the configuration command from the host bus at the second PCI bridge; and responding to the configuration command using the second PCI bridge such that the second PCI bridge appears to the processor to be directly coupled to the first PCI bus at a level of hierarchy below the first PCI bus when the second PCI bridge is actually indirectly coupled to the first PCI bus via the host bus and the first PCI bridge.

39. The method of claim 38 wherein the configuration command is a configuration write command that includes configuration data, the method further including:

storing the configuration data in a configuration register file of the second PCI bridge; and storing the configuration data in a shadow configuration register file of the first PCI bridge.

40. The method of claim 38 wherein the configuration data includes a base address that, together with a limit address stored in the first and second PCI bridges, defines an address range assigned to the second PCI bridge, the method further comprising:

transmitting from the processor on the host bus a transaction request directed to an address within the address range assigned to the second PCI bridge; and determining, based on the configuration data stored in the first PCI bridge, that the first PCI bridge should not forward the transaction request to the first PCI bus coupled to the first PCI bridge.

* * * * *

UNITED STATES PATENT AND TRADEMARK OFFICE
CERTIFICATE OF CORRECTION

PATENT NO. : 6,275,888 B1
DATED : August 14, 2001
INVENTOR(S) : A. Kent Porterfield It is certified that error appears in the above-identified patent and that said Letters Patent is hereby corrected as shown below:

Column 13,
Lines 45, 52 and 62, change "28" to -- 29 --

Column 14,
Line 56, change "act directly" to -- act of directly --

Signed and Sealed this

Nineteenth Day of August, 2003

JAMES E. ROGAN
*Director of the United States Patent and Trademark Office*